Nov. 24, 1953 A. F. BERNAU 2,660,349
ARTICLE CARRIER MEANS FOR AUTOMOBILE TRUNKS
Filed April 25, 1951
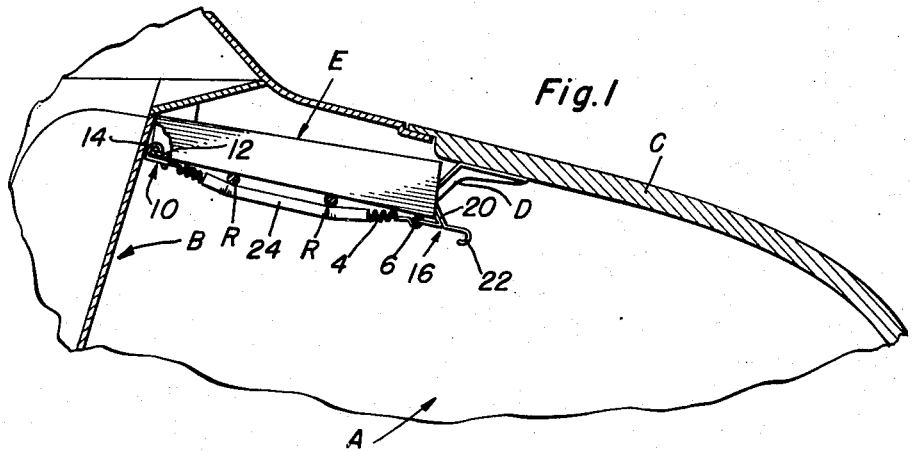
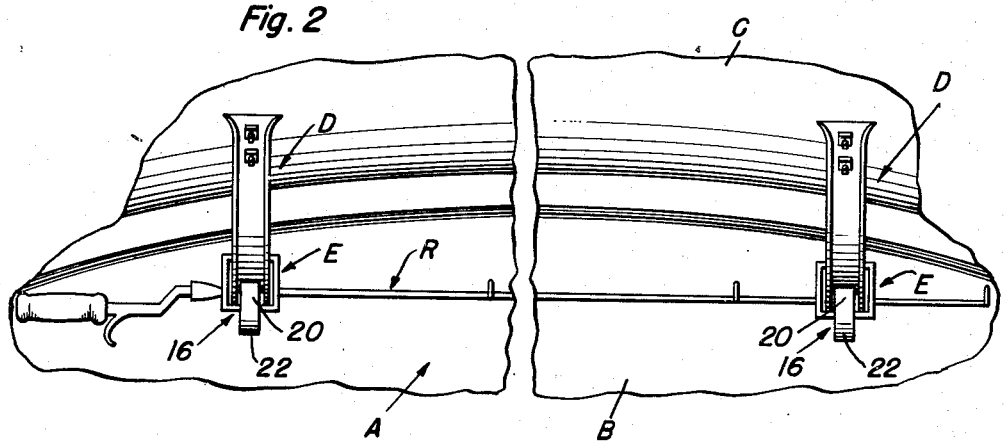
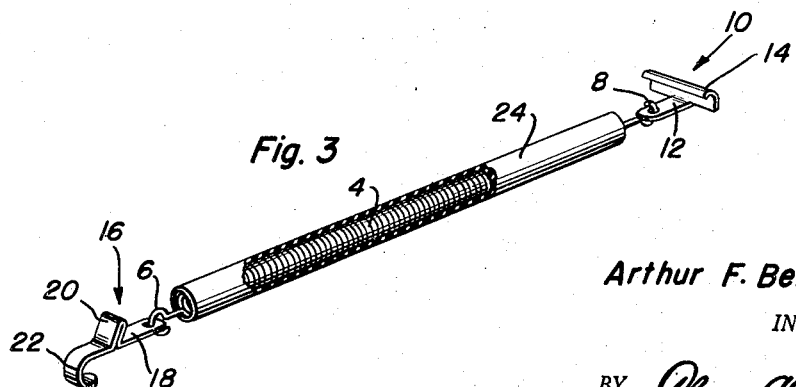
Arthur F. Bernau
INVENTOR.

Patented Nov. 24, 1953

2,660,349

UNITED STATES PATENT OFFICE 2,660,349

ARTICLE CARRIER MEANS FOR AUTOMOBILE TRUNKS

Arthur F. Bernau, Saginaw, Mich.

Application April 25, 1951, Serial No. 222,795

1 Claim. (Cl. 224—42.42)

This invention relates to the broad field of automotive equipment and accessories and has more particular reference to improved devices which are adapted to be sold in pairs and are expressly designed for installation in the trunk of an automobile, this in such a manner that they combine in affording satisfactory ways and means whereby fishing poles and similar light weight articles may be safely suspended for practical transportation purposes.

It is, of course, a matter of common knowledge that many and varied styles and forms of so-called automobile accessories and attachments have been provided to assist one in compactly and conveniently carry line-equipped rod and reel assemblies to and from a fishing ground. Some of these devices are attached to the roof of the car and others to the fenders and elsewhere. The present concept has to do with simple and economical hangers or suspension devices which may be aptly mounted within the confines of the trunk with the assurance that they will accommodate and carry several rods and the like with requisite ease and certainty and will do so with the rods easily insertable and removable.

The devices are to be sold and used in pairs. However, and insofar as the instant presentation is concerned, only a single device need be disclosed with particularity. To this end, novelty is predicated on a rod hanger and suspension device which takes the form of a readily attachable and detachable coil spring. The latter is suitably encased for full protection and special brackets are provided at opposite ends whereby said spring may be applied and sustained in position for use. In this connection it is to be pointed out that since the device disclosed is suitably applicable in the trunk of Chevrolet automobiles of 1950 make, novelty has to do with brackets which lend themselves applicable to spring boxes which are currently in use in Chevrolet trunks. It is to be understood, in this connection that the invention is not restricted to 1950 Chevrolet cars and may be used on other makes having adequate facilities therefor.

Briefly, and more specifically, the invention has to do with a coil spring resembling that used on present-day screen doors having two distinctly constructed brackets at opposite ends. One is of T-shape form with the head bent laterally and of hook form to provide an anchoring cleat. The other has two hooks, one an anchoring hook and the other a finger hook.

Other objects and advantages will become more readily apparent from the following description and the accompanying sheet of illustrative drawings.

In the accompanying sheets of drawings wherein like numerals are employed to designate like parts throughout the views:

Figure 1 is a fragmentary view with parts in section and elevation showing a portion of a trunk lid, a portion of the trunk, one of the so-called spring boxes, and one of the rod suspension attachments or devices in position and ready for use;

Figure 2 is a view taken at right angles to Figure 1 showing how the devices are employed in pairs to suspend coacting end portions of a rod and reel with or without the fishing line attached thereto; and Figure 3 is an enlarged perspective view with a portion broken away and shown in section.

Reference is had to Figures 1 and 2 wherein A designates a Chevrolet 1950 storage trunk construction. B denotes the forward wall of the trunk and C denotes the liftable and lowerable trunk lid. This lid is provided with hinging brackets D and they are operable in rear end portions of the spring housings or so-called spring boxes E (spring means not shown). It has been found that these spring boxes are excellent supports for the attachments herein under consideration. The attachments are used in pairs but it is necessary to detail but a single one of these attachments. Reference is, therefore, made to Figure 3 wherein it will be seen that the attachment is characterized essentially by a close coiled spring 4. This is of a length less than the length of the spring box E. It has attaching eyes 6 and 8 at opposite ends. The forward end 8 is provided with a T-shaped bracket 10 the stem of which is denoted at 12 and the head at 14 with the latter laterally bent to provide an anchoring cleat. This is slightly hooked as shown in Figures 1 and 3 and is shoved between the wall B and the forward end of the spring box E where it is wedged and anchored in place.

The complemental bracket, which may be referred to as the rear bracket, is denoted by the numeral 16. This is formed from strap metal which is bent upon itself to provide an attaching shank 18 which is secured to the eye 6, an intermediate oblique hook 20 and a terminal finger hook 22. The hook 20 is adapted to be projected into and anchored on the rear open end of the spring box E.

It will be evident from the foregoing that the attachment seen in Figure 3 of the drawings is applied so that the enclosed covered spring underlies the spring box E. The covering 24 is of rubber or any other suitable material and does not detract from the flexibiilty of the spring and yet keeps the coils or convolutions covered so that, where fishing lines are on the rods, there will be no likelihood of the lines or hooks getting caught in the coils of the springs. In any event the covered spring underlies the box E and the cleat 14 is jammed between the forward end of the box and the adjacent portion of the trunk where it is thus frictionally anchored in place. Then by catching hold of the finger hook 22 and stretching the spring the keeper or anchoring hook 20 may be anchored in place as illustrated. With two devices thus in position on the spring boxes the fishing rods R may be suspended and carried in the manner illustrated. It is, of course, possible to carry articles other than fishing rods. In fact, any light weight articles may be suspended and carried using either one or two of the spring attachments.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed.

Having described the invention, what is claimed as new is:

For attachment to and use in association with a tubular open ended spring box fixed in the trunk of an automobile wherein said spring box has one flat side; an article carrier expressly designed for attachment to and suspension on said spring box comprising, in combination, a coil spring adapted to coincide with said one flat side for purposes of clamping an article between itself and said one flat side, a T-shaped bracket attached to one end of said spring, said T-shaped bracket embodying a stem and a head portion, said head portion being bent laterally in respect to the plane of said stem and providing a spring tensioned and retained hook, the latter being adapted to be hooked over and thus anchored on one open end of said box, and another bracket attached at one end to the other end of said spring, the other end of said last named bracket being free and having a finger hook and the intermediate portion having an anchoring hook, said anchoring hook being adapted to be hooked over and thus anchored at the other open end of said box.

ARTHUR F. BERNAU.

References Cited in the file of this patent
UNITED STATES PATENTS

| Number | Name | Date |
|---|---|---|
| 1,627,476 | Barrett | May 3, 1927 |
| 1,798,001 | Seckler | Mar. 24, 1931 |
| 2,517,337 | Nodle | Aug. 1, 1950 |
| 2,573,102 | Hennessy | Oct. 30, 1951 |
| 2,576,327 | Wright | Nov. 27, 1951 |